United States Patent
Yang et al.

(10) Patent No.: US 8,352,225 B2
(45) Date of Patent: Jan. 8, 2013

(54) PROCESS FOR SIMULATING AND ASSEMBLING FLEXIBLE PARTS

(75) Inventors: Wuhua Yang, Ann Arbor, MI (US); Robert Bruce Tilove, Rochester Hills, MI (US); Richard A. Knoth, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1090 days.

(21) Appl. No.: 12/271,048

(22) Filed: Nov. 14, 2008

(65) Prior Publication Data

US 2010/0122451 A1 May 20, 2010

(51) Int. Cl.
G06F 7/48 (2006.01)

(52) U.S. Cl. .............................. 703/7; 703/6

(58) Field of Classification Search .............. 703/6–7; 700/97–98
See application file for complete search history.

(56) References Cited

U.S. PATENT DOCUMENTS

| | | | |
|---|---|---|---|
| 5,506,950 A * | 4/1996 | Hughes et al. | 345/420 |
| 7,206,723 B2 * | 4/2007 | Sawai et al. | 703/1 |
| 7,260,811 B2 * | 8/2007 | Sawai | 716/126 |
| 7,587,303 B2 * | 9/2009 | De Hillerin et al. | 703/2 |
| 7,647,211 B2 * | 1/2010 | Drumheller | 703/1 |
| 2005/0240383 A1 * | 10/2005 | Hashima et al. | 703/7 |

OTHER PUBLICATIONS

Wakamatsu et al., Modeling of Linear Objects Considering Bend, Twist, and Extensional Deformations. 1995 IEEE., p. 433-438.*

* cited by examiner

*Primary Examiner* — Eunhee Kim
(74) *Attorney, Agent, or Firm* — Quinn Law Group, PLLC

(57) ABSTRACT

A process for simulating and assembling flexible parts includes creating an ideal path between first and second planes and placing a virtual rigid envelope around the ideal path, and possibly tubular extensions beyond the path. A virtual flexible part is marked with reference features and pulled through the virtual rigid envelope, such that the path of the virtual flexible part is constrained but may rotate. Removing the virtual rigid envelope allows the virtual flexible part to relax, causing it to move to its lowest energy state. Zero-twist end conditions on the virtual flexible part are marked, corresponding to the intersection of the reference features with the planes. Identification marks are placed on a real flexible part, corresponding to the reference strips on the virtual flexible part. The real flexible part may then be assembled by aligning zero-twist marks on mating features to the identification marks on the real flexible part.

14 Claims, 6 Drawing Sheets

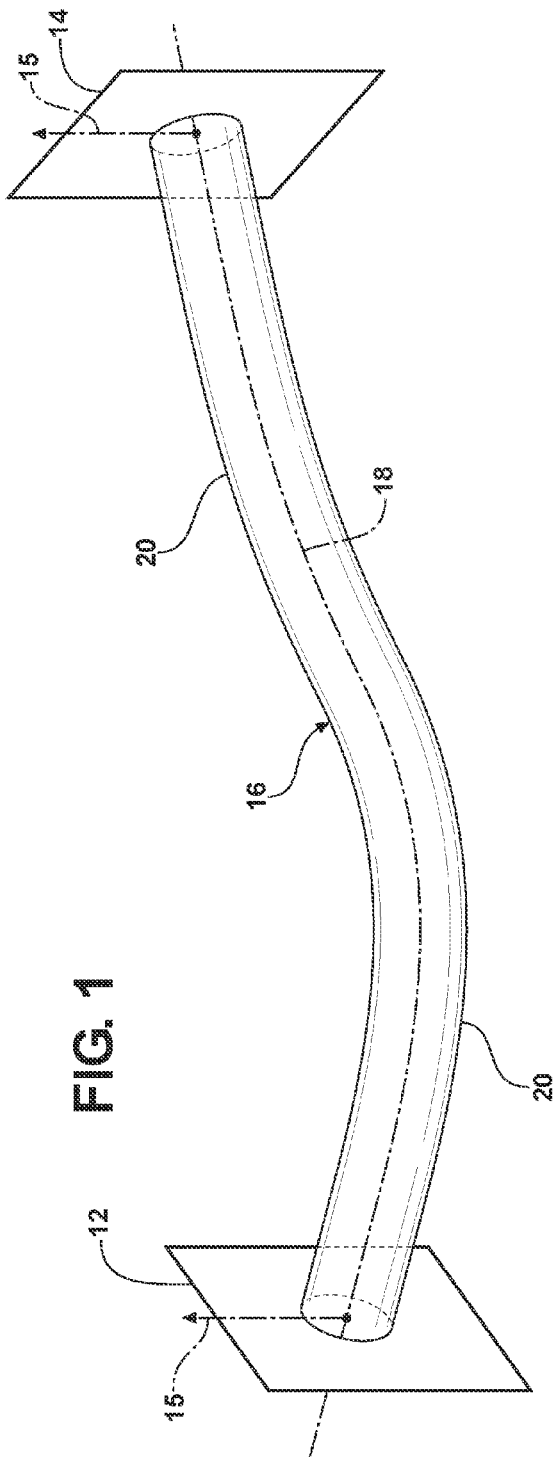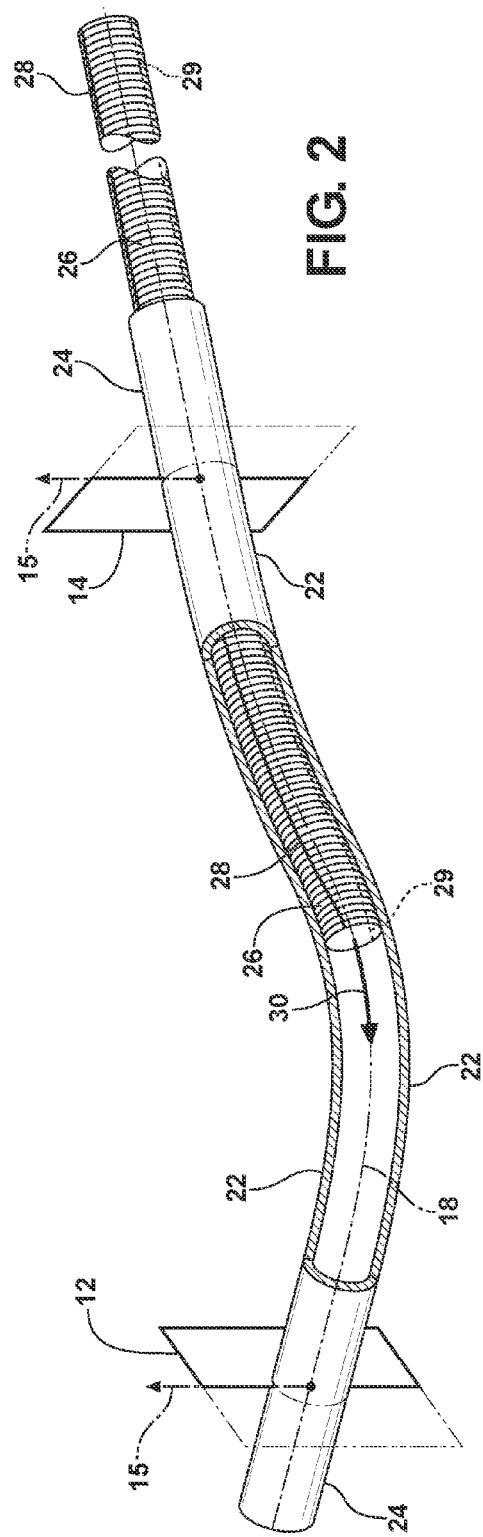

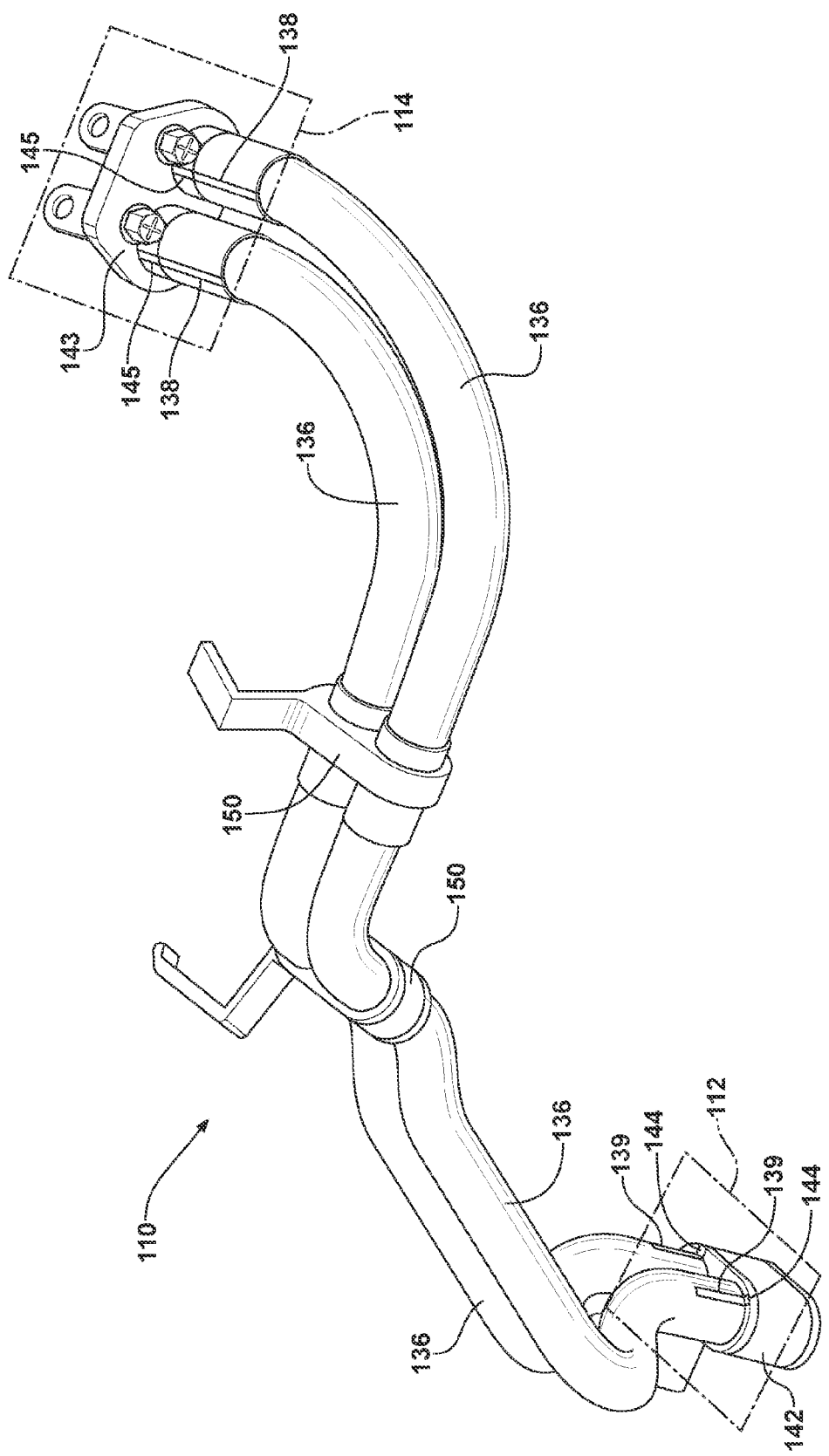

PROCESS FOR SIMULATING AND ASSEMBLING FLEXIBLE PARTS

TECHNICAL FIELD

This disclosure relates to design and simulation of flexible parts.

BACKGROUND OF THE INVENTION

The design, simulation, and assembly of flexible parts, such as cables, hoses and wire harness, becomes more difficult as the surrounding environments through which the flexible parts are routed becomes more complex. Increases in complexity of the surrounding environment may result in increases in the complexity of the path through which the flexible part must pass. With the introduction of the electric hybrid vehicle and fuel cell vehicles, there are more flexible parts used for various functional designs such as the heavy gauged, high-voltage cables to connect hybrid components. Current industrial practice for the routing design of flexible parts is carried out first by traditional computer aided design (CAD).

The CAD models assume that the flexible parts are actually rigid bodies—such as steel pipes—and do not account for the pliable properties of the flexible parts. This often leads to a large dimensional variation in the path of the as-assembled flexible part from the designer's intended path, due to the flexibility of the parts. As a consequence of inaccurate routing design, it may be difficult to keep the actual flexible parts used in the assembly process within range of the designer's intended path, which may result in problematic interactions with surrounding components. Furthermore, the need to apply significant force and torque during the assembly process may cause ergonomics issues and decrease efficiency.

SUMMARY

A process for simulating and assembling flexible parts includes creating an ideal path between first and second planes and placing a virtual rigid envelope around the ideal path from the first plane to the second plane. A virtual flexible part is marked with reference features, which, in some embodiments, may be reference strips. The virtual flexible part is then pulled through the virtual rigid envelope, such that the path of the virtual flexible part is constrained by the virtual rigid envelope, but the virtual flexible part is not constrained from rotating within the virtual rigid envelope.

Removing the virtual rigid envelope and allowing the virtual flexible part to relax causes the virtual flexible part to move to its lowest energy state. First and second end conditions on the virtual flexible part are marked. The first and second end conditions correspond, respectively, to the intersection of the reference features with the first and second planes, and may denote first and second zero-twist states in the relaxed virtual flexible part.

Identification marks are placed on a real flexible part, corresponding to the reference strips on the virtual flexible part. The process further includes locating mating features corresponding to the first and second planes, and placing zero-twist marks on the mating features, corresponding to the first and second end conditions of the virtual flexible part. The real flexible part may then be assembled by aligning the zero-twist marks on the mating features to the identification marks on the real flexible part.

Tubular extensions may be placed perpendicular to the first and second planes, opposite the virtual rigid envelope. Allowing the virtual flexible part to relax may include constraining rotation of one end of the virtual flexible part. The virtual rigid envelope may have an inner dimension within ten percent of the outer dimension of the real flexible part.

The above features and advantages and other features and advantages of the present invention are readily apparent from the following detailed description of the best modes and other embodiments for carrying out the invention when taken in connection with the accompanying drawings.

BRIEF DESCRIPTION OF THE DRAWINGS

FIG. 1 is a schematic perspective view of a simulated ideal path for a flexible part, running between two end planes;

FIG. 2 is a schematic perspective view of a virtual rigid envelope placed around the ideal path of FIG. 1, and having a virtual cable with reference features being pulled through;

FIG. 6 is a schematic perspective view of a flexible part assembly having two real cables and restraining features.

DESCRIPTION OF PREFERRED EMBODIMENTS

Figure 3:
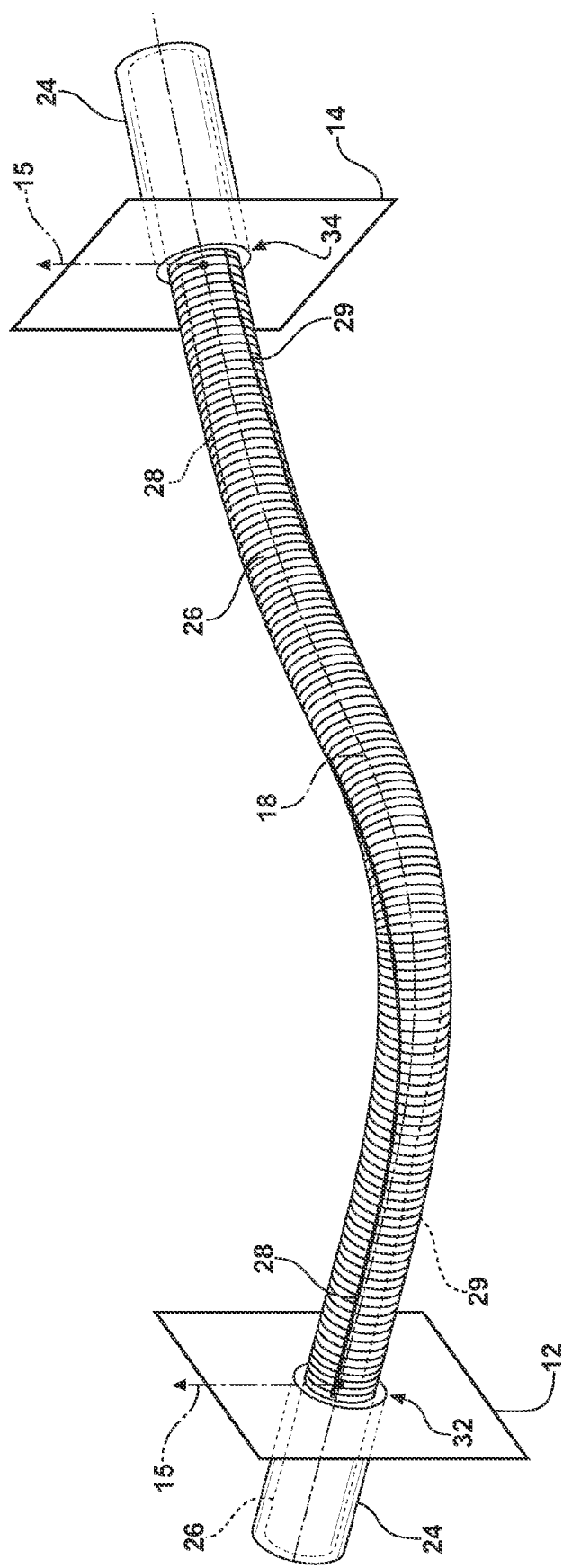
FIG. 3 is a schematic perspective view of the virtual cable shown in FIG. 2, shown after removing the virtual rigid envelope, such that the virtual cable is allowed to relax to a minimal energy state and its end conditions allowed to rotate to zero-twist states.

Referring to the drawings, wherein like reference numbers correspond to like or similar components throughout the several figures, there is shown in FIGS. 1-3 a schematic description of a design and simulation process for flexible parts. Examples of flexible parts in the automotive industry include air pipes, fuel pipes, electrical wires and cable, and tubes used on numerous vehicular systems and in production equipment like robots. It may be beneficial to use the claimed process to design and assemble these flexible parts in order to better predict the paths the flexible parts will take through complex three-dimensional environments, such as those in automotive and industrial applications.

First and second planes 12 and 14 represent the planned ending locations of the flexible part, such as the mating features into which the flexible part will be installed. The designer may position the first and second planes 12 and 14 based upon measurements taken from physical prototype parts or from a computer model (such as CAD software models) of the environment into which the flexible part will eventually be assembled. In the figures, first and second planes 12 and 14 are shown with a reference arrow 15, which generally corresponds to the upward direction in a vehicle.

An ideal path 16 is created between the first and second planes 12 and 14. The ideal path 16 includes a centerline 18 and an outer profile 20. The ideal path 16 is configured such that the outer profile 20 may pass through the surrounding environment without intersecting or conflicting with other components. In applications where the flexible part is a round cable or tube, the outer profile 20 is generally equivalent to the diameter of the cable rotated about the centerline 18.

Flexible parts having square or other non-circular shapes may be modeled by giving the outer profile 20 a diameter equivalent to the widest cross-sectional line of the flexible part. Because the rotation of the flexible part at specific points along the path is unknown, the outer profile 20 is configured to accommodate any orientation of non-circular flexible parts.

The outer profile 20 of the ideal path 16 represents the path the flexible part would take if it were a rigid, stress-free part, such as a preformed metal tube. However, the ideal path 16 does not account for the torque and bending forces created by the actual assembly process. In order to deform the flexible part through a complex three-dimensional path, and to connect the flexible part at the first and second planes 12 and 14, the flexible part has to bend and twist along its path.

A virtual rigid envelope 22 is then placed around the outer profile 20 of the ideal path 16 from the first plane 12 to the second plane 14. The virtual rigid envelope 22 is just larger than the outer profile 20, and substantially tracks the ideal path 16. In one embodiment, the virtual rigid envelope is approximately ten percent larger than the outer profile 20, which substantially tracks the outer dimensions of the actual flexible part being simulated. While the virtual rigid envelope 22 shown is configured to closely track the outer profile 20, with a slight gap between the two, the virtual rigid envelope 22 may, however, be configured with portions having greater clearance from the outer profile 20.

Tubular extensions 24 may also be placed at the first and second planes 12 and 14. The tubular extensions 24 are parallel to the ideal path 16 and placed on the opposite side of, and perpendicular to, the first and second planes 12 and 14 from the virtual rigid envelope 22.

A virtual cable 26 is marked along its length—which is longer than the centerline 18—with parallel reference strips 28 and 29, placed 180 degrees apart. The virtual cable 26 has simulated physical characteristics—such as, without limitation, bending stiffness, torsional stiffness and density—modeled after the flexible part subject to the simulation. When the virtual cable 26 is laid out flat and allowed to completely relax, the reference strips 28 and 29 are straight lines, representing the lowest energy state for the virtual cable—having no stored torque due to twisting. Those having skill in the art will recognize that while the method is described and illustrated with the virtual cable 26 and a real cable 36 (described below), the claimed process includes design and simulation of flexible parts other than cables.

The virtual cable 26 is then pulled through the virtual rigid envelope 22 by a perpendicular force 30. The inner radius of the virtual rigid envelope 22 is slightly larger than the radius of the virtual cable 26, therefore allowing some variation from the ideal path 16. The path of the virtual cable 26 is spatially constrained by the virtual rigid envelope 22, such that the virtual cable 26 is forced to bend through the virtual rigid envelope 22.

Although spatially constrained, the virtual cable 26 is allowed to freely twist or rotate as it is pulled through the virtual rigid envelope 22. Sliding contact with the virtual rigid envelope 22 causes the virtual cable 26 to deform within the virtual rigid envelope 22, such that the virtual cable 26 iteratively reaches its minimum energy state within the constrained path created by the virtual rigid envelope 22 as the virtual cable 26 is pulled between the first and second planes 12 and 14. As a consequence of the deformation of the virtual cable 26 within the virtual rigid envelope 22, internal stresses are built-up, and measured, along the virtual cable 26, which more-accurately simulate the internal stresses of an actual flexible part.

After the virtual cable 26 has been pulled through the full length of the virtual rigid envelope 22, and extends into the tubular extensions 24, the virtual rigid envelope 22 is removed. The virtual cable 26 is then allowed to relax without the spatial constraints of the virtual rigid envelope 22, and is allowed to freely twist. The internal stresses built-up as the virtual cable 26 was pulled through the virtual rigid envelope 22, and retained by the spatial constraints of the virtual rigid envelope 22, are released and the virtual cable 26 relaxes to its minimum energy state (a natural or free state) between the first and second planes 12 and 14.

Pulling the virtual cable 26 through the virtual rigid envelope 22 causes deformation in the virtual cable 26, and the relaxing phase allows for recovery of that deformation. Depending upon the three-dimensional shape of the ideal path 16 and upon the size of the virtual rigid envelope 22, the virtual cable 26 may experience elastic deformation, elastic-plastic deformation, or both. Elastic deformation (whether through bending or torsion) is capable of fully recovering to the original shape. Plastic deformation, however, will result in deformation that is largely permanent. The relaxing phase accounts for both elastic and elastic-plastic (a mix of both) deformation, such that some portions of the relaxed virtual cable 26 may attempt to recover to the un-bent, un-twisted state; and other portions (those with plastic deformation) will not attempt to fully recover.

During this relaxing phase, the tubular extensions 24 are not removed, which minimizes bending-stress concentrations at the ends of the virtual cable 26 by keeping the virtual cable 26 perpendicular to the first and second planes 12 and 14. The length of the virtual cable 26 between the first and second planes 12 and 14 may change during the relaxing phase. In one embodiment of the simulation process, one end of the virtual cable 26 is constrained from rotating during the relaxing phase.

Relaxing the virtual cable 26 allows the virtual cable 26 to bend and twist to its minimum energy position, which simulates the path the actual flexible part will take when placed in the vehicle. Without the relaxing phase, the virtual cable 26 will retain stress caused by the spatial constraints of the virtual rigid envelope 22, which does not have an exact equivalent in the as-assembled environment of the actual flexible part. If the actual flexible part were modeled after the non-relaxed virtual cable 26, the actual flexible part may exhibit an unplanned tendency to twist or flex during installation.

Twisting and flexing during installation of the actual flexible part increases the difficulty of installing the part in the vehicle or other industrial application. Furthermore, the stresses built up by the torque required to install an improperly-aligned cable may cause the actual flexible part to route itself significantly away from the ideal path 16.

After the virtual cable 26 has fully relaxed, the intersections of the reference strips 28 and 29 with the first and second planes 12 and 14 are marked to denote first and second end conditions 32 and 34. The first and second end conditions 32 and 34 represent a simulation of the zero-twist states (described in more detail below) at respective first and second ends 35 and 37 of the actual flexible part when installed in the vehicle.

With continued reference to FIGS. 1-3, FIGS. 4A, 4B, 5A, and 5B schematically depict the process of taking the simulated virtual cable 26 and converting that simulation into an accurate as-assembled real cable 36. The process of assembling the actual flexible part further includes attaching the first and second ends 35 and 37 of the real cable 36 to mating features on the vehicle.

Figure 4A:
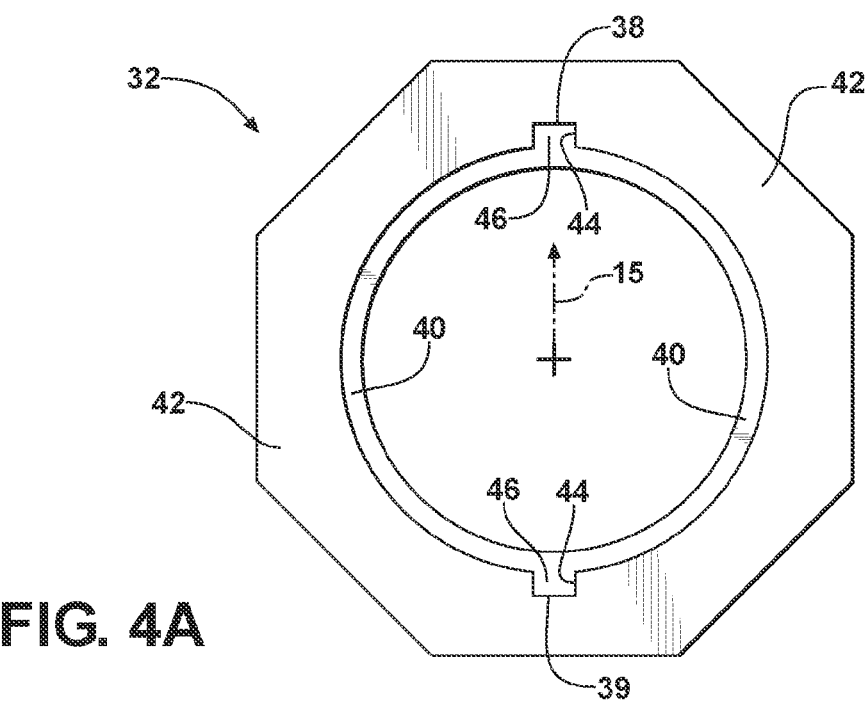
FIG. 4A is a schematic plan view of one end of a real cable and mating feature, showing the zero-twist state of that end.
Figure 4B:
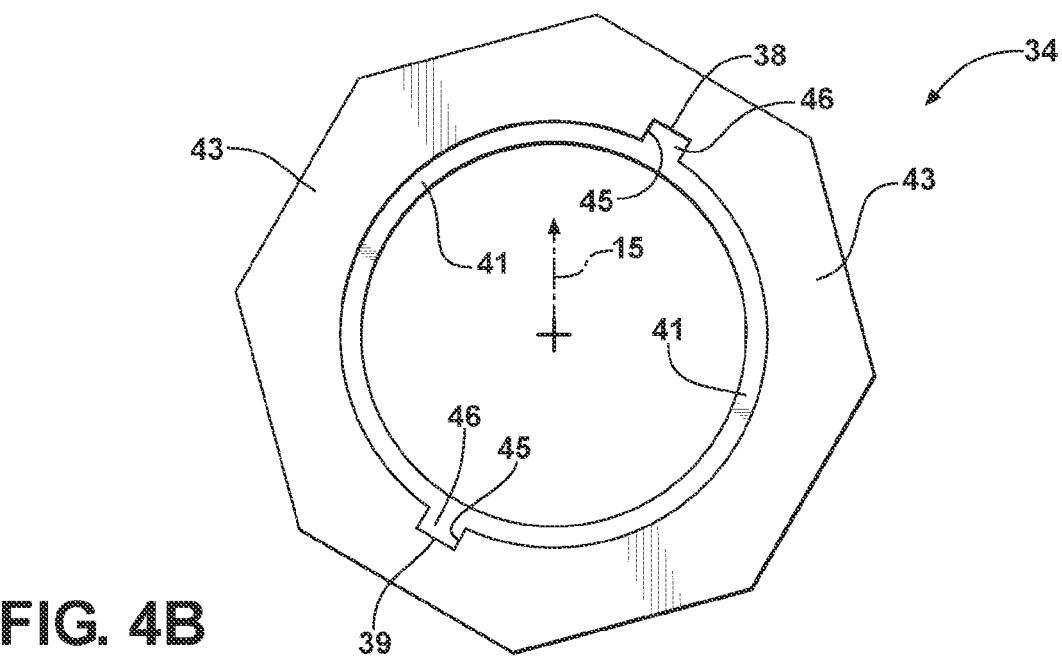
FIG. 4B is a schematic plan view of the other end of the real cable and the associated mating feature, showing the zero-twist state of that end.

FIGS. 4A and 4B show the first and second end conditions 32 and 34 determined from the relaxed virtual cable 26 shown in FIG. 3. Identification marks 38 and 39 have been placed on the real cable 36 to correspond to the reference strips 28 and 29 of the virtual cable 26.

Real cable 36 also includes end connectors 40 and 41 which are attached to the ends of the real cable 36 to facilitate aligned mating to corresponding mating features or hubs 42 and 43. The hubs 42 and 43 in the embodiment shown in FIGS. 4A and 4B are configured with keyways 44 and 45 such that keys 46 on the end connectors 40 and 41 must be properly aligned in order to mate the end connectors 40 and 41 to the hubs 42 and 43.

The relative location and orientation of the hubs 42 and 43 to each other is substantially the same as the relative location and orientation of the planes 12 and 14. The alignment of the keyways 44 and 45 within each of the hubs 42 and 43 is modeled from the end conditions 32 and 34 determined from the simulation shown in FIGS. 1-3. By locating the keyways 44 and 45 based upon end conditions 32 and 34, the keyways 44 and 45 represent the zero-twist states of the first and second ends 35 and 37 of the real cable 36. In addition to forcing proper alignment of the end connectors 40 and 41, the keyways 44 and 45 act as markers which identify the proper rotation of the identification strips 38 and 39.

In the embodiment shown, the end condition 32 has been fixed at the first plane 12, such that the identification marks 38 and 39—and, therefore, the keys 46—are vertically aligned relative to the hub 42. This is the zero-twist state for the end condition 32. The "zero-twist state" is the alignment of the first end 35 of the real cable 36 which requires little or no torque to attach and align the end connector 40 with the hub 42.

By simulating and identifying the zero-twist states of the first and second end conditions 32 and 34, the actually assembly—at, for example, the assembly plant by a worker or automated process—of the first and second ends 35 and 37 may occur with reduced effort and energy. The process for simulating and assembling flexible parts described herein seeks to reduce actual assembly effort and energy by removing errors that may occur between traditional (rigid-body) simulation and actual part design, by determining and accounting for the natural twisting and bending caused by routing the flexible part through a complex three-dimensional path.

As shown in FIG. 4B, the real cable 36 in this embodiment intersects the second plane 14, and thus the end connector 41 mates to the hub 43, at a slightly different angle. The zero-twist state of the second end 37—corresponding to the zero-twist end condition 34 determined in the simulation—occurs where the identification marks 38 and 39 are rotated counter-clockwise by approximately 45 degrees. Therefore, the hub 43 has keyways 45 which are similarly rotated to assist in properly aligning the end connector 41 at its zero-twist state before the end connector 41 is mated to the hub 43. Proper alignment of the end connector 41 to the hub 43 may reduce the effort and energy required to assemble the real cable 36.

Figure 5A:
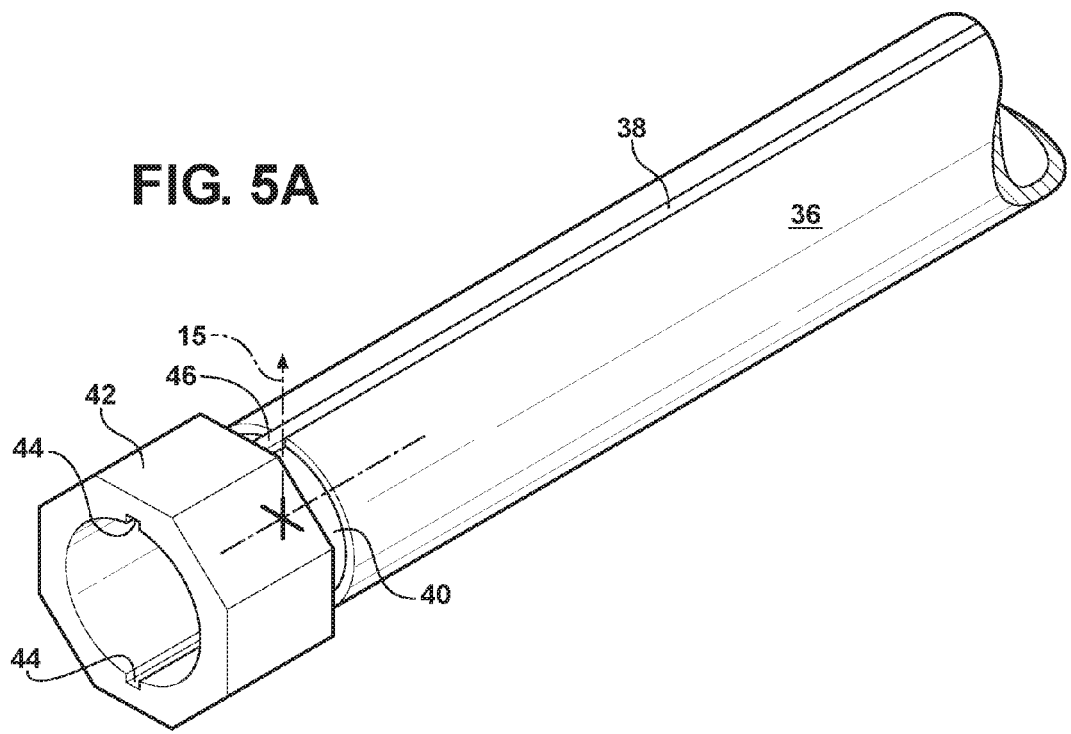
FIG. 5A is a schematic perspective partial view of the end of the real cable and associated mating feature shown in FIG. 4A.
Figure 5B:
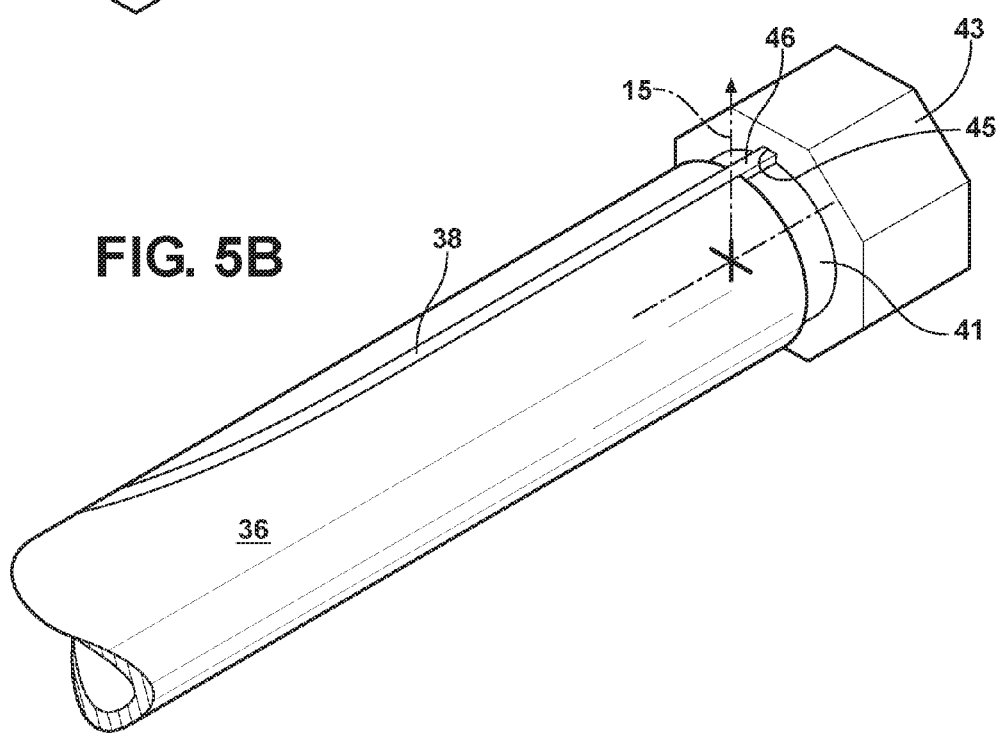
FIG. 5B is a schematic perspective partial view of the end of the real cable and associated mating feature shown in FIG. 4B.

FIGS. 5A and 5B show end portions of the real cable 36 with the identification marks 38 and 39 (hidden from view in FIGS. 5A and 5B) corresponding to the reference strips 28 and 29 of the virtual cable 26 (shown in FIGS. 2 and 3). FIG. 5A shows the end connector 40 mated to the hub 42, such that the as-assembled real cable 36 satisfies the alignment of the end condition 32 in a zero-twist state. FIG. 5B similarly shows the end connector 41 mated to the hub 43, such that the as-assembled real cable 36 is rotated at the second end 37 and satisfies the alignment of the end condition 34 in the zero-twist state.

Those having ordinary skill in the art will recognize mating features for the real cable 36 in addition to the hubs 42 and 43. Furthermore, the zero-twist states may simply be marked on the mating features in order to assist an operator to properly align the ends of the real cable 36 during assembly.

Proper alignment of the real cable 36 benefits the assembly process in numerous ways. The effort required for assembly is reduced when, after routing the real cable 36 along the ideal path 16, the end connectors 40 and 41 of the real cable 36 are naturally aligned to closely match the end conditions 32 and 34, from which the hubs 42 and 43 are modeled. Additionally, the real cable 36 may be able to conform to the ideal path 16 simply by properly aligning the end connectors 40 and 41 with their respective hubs 42 and 43.

FIG. 6 shows a flexible part assembly 110, which has a more-complex path for two flexible parts (real cables 136) both of which may be simulated using the described process for simulating and assembling flexible parts. Two ideal paths (not shown) were created between first and second planes 112 and 114, and then virtual cables (not shown) were pulled through respective virtual rigid envelopes (not shown).

This embodiment of the flexible part assembly 110 includes restraining features, such as one or more restraining clips 150 along the ideal paths. Simulation of the restraining clips 150 occurs by removing only some portions of the virtual rigid envelope while allowing the virtual cables to relax. Like the virtual rigid envelope, the restraining clips 150 restrict the path of real cables 136 but do not constrain the real cables 136 from rotating at the restraining clips 150.

First and second hubs 142 and 143 act as the mating features at the ends of real cables 136. In this embodiment, each of the hubs 142 and 143 mate to two of the real cables 136. Mating two real cables 136 to the hubs 142 and 143 increases the difficulty in properly aligning the real cables 136 without significant residual stresses. Therefore, the hubs 142 and 143, and identification marks 138 and 139 placed on the real cables 136, must be configured to align the ends of the real cables 136 with the hubs 142 and 143 in zero-twist states.

Zero-twist marks 144 and 145 are placed on the hubs 142 and 143. The zero-twist marks 144 and 145 identify the proper alignment of the identification marks 138 and 139, as determined by relaxing the virtual cables between the first and second planes 112 and 114 and the restraining features 150.

Figure 7:
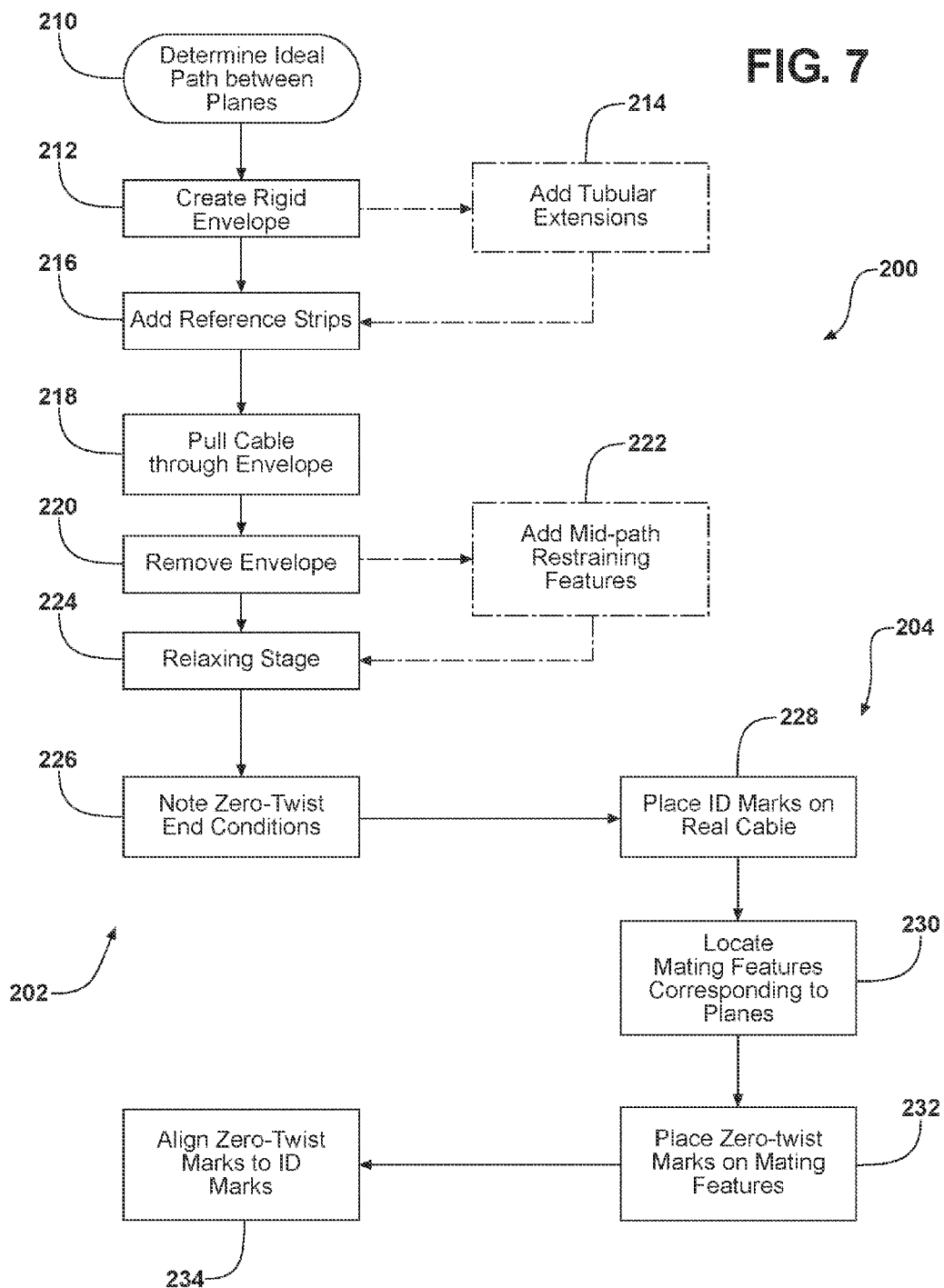
FIG. 7 is a schematic flow chart of a process for simulating and assembling flexible parts, which may be used to design, manufacture, and assemble the flexible part assemblies shown in FIGS. 1-6.

FIG. 7 is a flowchart representing one embodiment of a process 200 for simulating and assembling flexible parts. The process 200 generally includes simulation steps 202 and manufacturing or assembly steps 204. For illustrative purposes, the process 200 is described with reference to techniques and structures shown and described in relation to FIGS. 1-3, 4A-5B, and 6. However, those having ordinary skill in the art will recognize other techniques and structure which may be used to practice the process 200 and the invention as defined in the appended claims.

The process 200 begins at step 210, where the ideal path 16 is determined from the surrounding environment, such as a vehicle engine bay or other industrial environment. The first and second planes 12 and 14 act as end boundaries of the flexible part and, therefore, also for the ideal path 16 created for the simulation. The first and second planes 12 and 14 are located based upon the mating features (such as the hubs 42 and 43) to which the flexible part will be attached.

Step 212 creates the virtual rigid envelope 22 around and along the ideal path 16, having a slightly larger cross section than that of the flexible part (such as real cable 36) which will be placed in the surrounding environment. Step 214 is an optional step of adding tubular extensions 24 on the sides of the first and second planes 12 and 14 opposing the virtual rigid envelope 22, to further define the pathway for the virtual cable 26.

Step 216 includes marking the virtual cable 26 with one or more reference features, such as the reference strips 28 and 29, which assist in tracking the rotation of the virtual cable as it is pulled through the virtual rigid envelope 22 in step 218. As the virtual cable 26 is pulled through the virtual rigid envelope 22, the internal stresses, location, and rotation of the virtual cable 26 are monitored.

Step 220 removes the virtual rigid envelope 22 from around the virtual cable 26, allowing the virtual cable 26 to relax to its minimum energy position at step 224. The reference strips 28 and 29 allow the process 200 to note the relative angle of the virtual cable 26 at the intersections with the first and second planes 12 and 14. These end conditions 32 and 34 represent the zero-twist states for the relaxed virtual cable 26.

The optional step 222 retains portions or sections of the virtual rigid envelope 22 at predetermined points along the ideal path 16, instead of allowing the whole length of virtual cable 26 to relax. These sections simulate restraining features, such as the restraining clips 150 shown in FIG. 6, which may be included in the final assembly of the flexible part.

The end conditions 32 and 34 are marked or noted in step 226. Noting the end conditions 32 and 34—and more specifically, the relative angle of the reference strips 28 and 29—allows the real cable 36 to also be assembled with the zero-twist states determined from the relaxing phase. Step 226 generally completes the simulation steps 202.

Step 228 includes supplying the real cable 36 and marking it with identification features, such as identification marks 38 and 39, corresponding to the reference features on the virtual cable 26. Mating features, such as the hubs 42 and 43, are placed or located in the vehicle or subassembly at step 230. The location of the mating features corresponds generally to the first and second planes 12 and 14, and vice versa.

Step 232 includes placing zero-twist marks, such as the keyways 44 and 45 or the zero-twist marks 144 and 145, on the mating features. The zero-twist marks mimic the end conditions 32 and 34, and allow the real cable 36 to be mated to the hubs 42 and 43 in the same orientation as the virtual cable 26 intersected the first and second planes 12 and 14 after the relaxing stage of step 224.

Step 234 generally completes the assembly process by attaching the ends of the real cable 36 to the hubs 42 and 43. The identification marks 38 and 39 are aligned with the zero-twist marks on the hubs 42 and 43 (or other mating features) in order to maintain zero-twist states at the ends of the real cable 36.

While the best modes and other embodiments for carrying out the claimed invention have been described in detail, those familiar with the art to which this invention relates will recognize various alternative designs and embodiments for practicing the invention within the scope of the appended claims.

The invention claimed is:

1. A process for simulating and assembling flexible parts, comprising:
   creating an ideal path between first and second planes;
   placing a virtual rigid envelope around the ideal path from the first plane to the second plane;
   marking a virtual flexible part with reference features;
   pulling the virtual flexible part through the virtual rigid envelope, such that the path of the virtual flexible part is constrained by the virtual rigid envelope, wherein the virtual flexible part is not constrained from rotating within the virtual rigid envelope;
   removing the virtual rigid envelope and allowing the virtual flexible part to relax; and
   marking first and second end conditions on the virtual flexible part corresponding respectively to an intersection of the reference features with the first and second planes.

2. The process of claim 1, wherein the first and second end conditions denote first and second zero-twist states in the relaxed virtual flexible part.

3. The process of claim 2, further comprising placing identification marks on a real flexible part, corresponding to the reference strips on the virtual flexible part.

4. The process of claim 3, further comprising:
   locating mating features corresponding to the first and second planes;
   placing zero-twist marks on the mating features, corresponding to the first and second end conditions of the virtual flexible part; and
   assembling the real flexible part by aligning the zero-twist marks on the mating features to the identification marks on the real flexible part.

5. The process of claim 4, further comprising placing tubular extensions perpendicular to the first and second planes opposite the virtual rigid envelope.

6. The process of claim 5, wherein allowing the virtual flexible part to relax includes constraining rotation of one end of the virtual flexible part.

7. The process of claim 6, further comprising adding one or more restraining features along the ideal path, such that the restraining features restrict the path of the virtual flexible part, wherein the virtual flexible part is not constrained from rotating by the restraining features.

8. The process of claim 7, wherein the reference features are reference strips extending along the length of the virtual flexible part.

9. The process of claim 8, wherein the virtual rigid envelope has an inner dimension within ten percent of the outer dimension of the real flexible part.

10. A process for simulating and assembling flexible parts, comprising:
    creating an ideal path between first and second planes;
    placing a virtual rigid envelope around the ideal path from the first plane to the second plane;
    placing tubular extensions perpendicular to the first and second planes opposite the virtual rigid envelope;
    marking a virtual flexible part with reference features;
    pulling the virtual flexible part through the virtual rigid envelope and the tubular extensions, such that the path of the virtual flexible part is constrained by the virtual rigid envelope and the tubular extensions, wherein the virtual flexible part is not constrained from rotating within the virtual rigid envelope and the tubular extensions;
    removing the virtual rigid envelope and allowing the virtual flexible part to relax; and
    marking first and second end conditions on the virtual flexible part corresponding respectively to an intersection of the reference features with the first and second planes.

11. The process of claim 10, wherein the first and second end conditions denote first and second zero-twist states in the relaxed virtual flexible part.

12. The process of claim 11, wherein allowing the virtual flexible part to relax includes constraining rotation of one end of the virtual flexible part.

13. The process of claim 12, further comprising placing identification marks on a real flexible part, corresponding to the reference strips on the virtual flexible part;

locating mating features corresponding to the first and second planes;

placing zero-twist marks on the mating features, corresponding to the first and second end conditions of the virtual flexible part; and assembling the real flexible part by aligning the zero-twist marks on the mating features to the identification marks on the real flexible part.

14. The process of claim 13, further comprising adding one or more restraining features along the ideal path, such that the restraining features restrict the path of the virtual flexible part, wherein the virtual flexible part is not constrained from rotating by the restraining features.

* * * * *